(12) United States Patent
Barendrecht

(10) Patent No.: US 10,968,982 B2
(45) Date of Patent: Apr. 6, 2021

(54) TRANSMISSION, PARTICULARLY FOR A WHEELED VEHICLE, AND WHEELED VEHICLE EQUIPPED WITH SUCH A TRANSMISSION

(71) Applicant: FRANCE REDUCTEURS, Les Herbiers (FR)

(72) Inventor: Wouter Barendrecht, Cholet (FR)

(73) Assignee: FRANCE REDUCTEURS, Les Herbiers (FR)

( * ) Notice: Subject to any disclaimer, the term of this patent is extended or adjusted under 35 U.S.C. 154(b) by 34 days.

(21) Appl. No.: 16/311,537

(22) PCT Filed: Jun. 20, 2017

(86) PCT No.: PCT/FR2017/051612
§ 371 (c)(1),
(2) Date: Dec. 19, 2018

(87) PCT Pub. No.: WO2018/002477
PCT Pub. Date: Jan. 4, 2018

(65) Prior Publication Data
US 2019/0331200 A1     Oct. 31, 2019

(30) Foreign Application Priority Data

Jun. 28, 2016    (FR) ...................................... 16 56033

(51) Int. Cl.
*F16H 1/28*       (2006.01)
*F16H 3/091*     (2006.01)
(Continued)

(52) U.S. Cl.
CPC ............. *F16H 3/091* (2013.01); *F16H 37/04* (2013.01); *F16D 11/14* (2013.01); *F16H 63/04* (2013.01);
(Continued)

(58) Field of Classification Search
CPC .......... F16H 2057/02034; F16H 3/091; F16H 2200/0034; F16H 3/72; F16H 63/04;
(Continued)

(56) References Cited

U.S. PATENT DOCUMENTS 1,782,001 A * 11/1930 Crichton ................ B60K 17/08
475/5
9,434,038 B2 * 9/2016 Elger ..................... B23Q 5/142
(Continued)

FOREIGN PATENT DOCUMENTS

| CN | 102 189 926 | 9/2011 |
|---|---|---|
| DE | 10 2010 007066 | 8/2011 |
| EP | 2 332 760 | 6/2011 |

OTHER PUBLICATIONS

International Search Report dated Mar. 2, 2017.

*Primary Examiner* — Stacy A Fluhart
(74) *Attorney, Agent, or Firm* — IPSILON USA, LLP

(57) ABSTRACT

The transmission (1) comprises a housing (2), a first motor (41), a second motor (42), a first and a second input shaft (51, 52), respectively able to be driven in rotation, one (51) by the first motor (41), the other (52) by the second motor (42), two clutch mechanisms (71, 72) and two reduction gears (91, 92), wherein the output shaft (31, 32) is formed by two output shaft sections (31, 32) interconnected such that they rotate freely, the clutch mechanisms (71, 72) are each equipped with a clutch control member operable by a user for allowing the transmission, in the engaged state of the first clutch mechanism (71), of the rotational movement of the first input shaft (51) to the first output shaft section (31), and the transmission, in the engaged state of the second clutch mechanism (72), of the rotational movement of the second input shaft (52) to the second output shaft section
(Continued)

(32), and the reduction gears (91, 92) are at least partially received inside the housing (2).

13 Claims, 9 Drawing Sheets

(51) Int. Cl.
*F16H 37/04* (2006.01)
*F16D 11/14* (2006.01)
*F16H 63/04* (2006.01)
*F16H 63/30* (2006.01)
*F16H 57/02* (2012.01)

(52) U.S. Cl.
CPC .... *F16H 63/30* (2013.01); *F16H 2057/02034* (2013.01); *F16H 2063/3093* (2013.01); *F16H 2200/0034* (2013.01); *F16H 2702/02* (2013.01)

(58) Field of Classification Search
CPC ......... F16H 2063/3093; F16H 2702/02; F16D 2023/141; F16D 23/14
See application file for complete search history.

(56) References Cited

U.S. PATENT DOCUMENTS

| | | | |
|---|---|---|---|
| 2011/0139522 A1* | 6/2011 | Takenaka | B60K 1/02 |
| | | | 180/65.1 |
| 2012/0158233 A1* | 6/2012 | Makino | B60K 6/52 |
| | | | 701/22 |
| 2013/0019707 A1 | 1/2013 | Ebihara et al. | |
| 2014/0004987 A1 | 1/2014 | Sato et al. | |
| 2016/0017968 A1 | 1/2016 | Kaltenbach et al. | |

* cited by examiner

TRANSMISSION, PARTICULARLY FOR A WHEELED VEHICLE, AND WHEELED VEHICLE EQUIPPED WITH SUCH A TRANSMISSION

RELATED APPLICATION

This application is a National Phase of PCT/FR2017/051612, filed on Jun. 20, 2017, which claims the benefit of priority from French Patent Application Nos. 16 56033, filed on Jun. 28, 2016, the entirety of which are incorporated by reference.

FIELD OF THE INVENTION

The invention relates to a transmission, in particular for a wheeled vehicle, and to a wheeled vehicle fitted with such a transmission.

The invention relates more particularly to a transmission comprising a housing defining an enclosure and an outlet shaft housed at least in part in said housing.

PRIOR ART

In general, when a wheeled vehicle is fitted with a transmission for rotating at least one pair of wheels of the vehicle, with each wheel driven independently of the other, the assembly is as shown in FIG. 1, which shows the state of the art. Thus, the shaft for driving the wheels, also referred to as the outlet shaft of the transmission, is formed by two half-shafts, each housed at least in part in a housing. Each housing houses a motor with a drive shaft engaged by meshing directly with the outlet half-shaft for driving a wheel of the vehicle. With such an assembly, under the effect of the weight of the chassis of the vehicle, there exists a considerable risk of misalignment between the outlet half-shafts, as shown in FIG. 1. That misalignment may have damaging consequences for driving the vehicle.

In order to avoid that misalignment, it is necessary to reinforce the bearings and to increase the mechanical strength of the transmission assembly, thus generating additional cost.

It is also known, as shown in patent US 2011/0139522, to propose a transmission in which two motors are integrated in one housing. That results in bulkiness of the housing and makes it necessary to reinforce the housing in order for the housing to be able to support both the motors and the outlet shaft. That reinforcement leads to additional cost of the assembly.

OBJECTS AND SUMMARY

An object of the invention is therefore to provide a transmission and a vehicle fitted with such a transmission, of designs that make it possible to obtain a transmission that is more compact, with a reduced risk of premature damage of said transmission, since the mechanical strength of the transmission is improved at lower cost.

Another object of the invention is to provide a transmission and a wheeled vehicle fitted with such a transmission, of designs that make it possible to engage freewheeling easily, to use a differential function, and to use low-torque motors in order to reduce the cost of the transmission.

Another object of the invention is to provide a transmission and a wheeled vehicle fitted with such a transmission, of designs that make it possible to vary the speed of the outlet shaft of the transmission over a wide range.

To this end, the invention provides a transmission of the type comprising a housing defining an enclosure, an outlet shaft housed at least in part in said housing, a first motor, a second motor, and two reduction gears, the transmission being characterized in that the first motor and the second motor are outside the housing, in that the transmission further comprises a first inlet shaft, a second inlet shaft, and two clutch mechanisms, in that said first and second inlet shafts are respectively suitable for being driven in rotation, one of them by the first motor, the other one of them by the second motor, in that the outlet shaft parallel to the first and second inlet shafts is formed by a first outlet shaft section and by a second outlet shaft section, which sections are connected together in such a manner as to be free to rotate relative to each other via at least one connection part arranged inside the housing, in that the clutch mechanisms, which are arranged one of them as a "first" clutch mechanism, between the first motor and the first outlet shaft section, and the other of them as a "second" clutch mechanism between the second motor and the second outlet shaft section, are fitted with respective clutch control members that are operable by a user in order, in the clutched state of the first clutch mechanism, to enable rotary motion to be transmitted from the first inlet shaft to the first outlet shaft section and, in the clutched state of the second clutch mechanism, to enable rotary motion to be transmitted from the second inlet shaft to the second outlet shaft section, and in that the reduction gears, which are arranged at least in part, one of them between the first motor and the first outlet shaft section, and the other one of them between the second motor and the second outlet shaft section, are housed at least in part inside the housing.

Making the outlet shaft in the form of at least two half-shafts connected together via at least one connection part housed inside the housing makes it possible to increase the stiffness of the outlet shaft, without reducing the compactness and the versatility of the transmission.

Making the outlet shaft in the form of at least two half-shafts that can be driven independently of each other by respective motors makes possible to have a speed and/or a direction of rotation that is different from one half-shaft to another, in particular when the motors are direction-reversible motors.

In an embodiment, the first and second clutch mechanisms are respectively arranged at least in part inside the housing, one on the first inlet shaft, or on an "intermediate" shaft, to which the rotary motion of the first inlet shaft is suitable for being transmitted, and the other on the second inlet shaft, or on an "intermediate" shaft, to which the rotary motion of the second inlet shaft is suitable for being transmitted.

The presence of two clutch mechanisms makes it possible to cause each outlet shaft section to freewheel, thus making it easier to handle the wheeled vehicle when the transmission is applied to a wheeled vehicle.

In an embodiment, a first transmission assembly is formed by the first motor, the first inlet shaft, the first clutch mechanism carried by the first inlet shaft or by an intermediate shaft to which the rotary motion of the first inlet shaft is suitable for being transmitted, the first outlet shaft section, and the reduction gear arranged at least in part between the first motor and the first outlet shaft section, a second transmission assembly is formed by the second motor, the second inlet shaft, the second clutch mechanism carried by the second inlet shaft or by an intermediate shaft to which the rotary motion of the second inlet shaft is suitable for being transmitted, the second outlet shaft section, and the reduction gear arranged at least in part between the second motor and the second outlet shaft section, with the reduction gear of at least one of the first or second transmission assemblies comprising at least two gear trains with a reduction ratio that is different from one gear train to another, in that each gear train of the reduction gear of said transmission assembly is arranged between the inlet shaft and the outlet shaft section of said transmission assembly, and the clutch mechanism of said transmission assembly presents at least one declutched position and two clutched positions that are selectively activatable, the outlet shaft section of said assembly being mounted to be free to rotate in the declutched position of said clutch mechanism and to be engaged with the inlet shaft of said transmission assembly at least via the first gear train in the first clutched position of the clutch mechanism and at least via the second gear train in the second clutched position of the clutch mechanism.

This results in it being possible to vary the speed of each outlet shaft section over a wide range, by means of a low-torque motor, the clutch control member acting both as the clutch mechanism control member and also as the outlet shaft speed control member. This results in a transmission that is simple, thus enabling it to be compact.

In an embodiment of the type in which a first transmission assembly is formed by the first motor, the first inlet shaft, the first clutch mechanism carried by the first inlet shaft or by an intermediate shaft to which the motion of the first inlet shaft is suitable for being transmitted, the first outlet shaft section, and the reduction gear arranged at least in part between the first motor and the first outlet shaft section, and a second transmission assembly is formed by the second motor, the second inlet shaft, the second clutch mechanism carried by the second inlet shaft or by an intermediate shaft to which the motion of the second inlet shaft is suitable for being transmitted, the second outlet shaft section, and the reduction gear arranged at least in part between the second motor and the second outlet shaft section, the transmission is characterized in that the reduction gear of at least one of the first and second transmission assemblies comprises an epicyclic gear train arranged between the motor of said assembly and the shaft carrying the clutch mechanism of said assembly. Once again, this reduction makes it possible to use the motors with a high speed of rotation and with low torque, which are less expensive.

In an embodiment, at least one and preferably each of the first and second clutch mechanisms is a dog clutch mechanism.

In an embodiment, the dog clutch mechanism comprises two "stationary" dog clutches mounted to be stationary axially and free to rotate on the shaft carrying the clutch mechanism and a movable dog clutch that is interposed between said stationary dog clutches, the movable dog clutch being mounted on the shaft carrying said clutch mechanism, being constrained to rotate therewith, and being movable axially by means of the clutch control member of said clutch mechanism to move said movable dog clutch between a declutched position away from said stationary dog clutches, a first clutched position engaged with one of the stationary dog clutches, and a second clutched position engaged with the other stationary dog clutch.

In an embodiment, the clutch control member for controlling the first clutch mechanism is mounted to be constrained to move with the clutch control member for controlling the second clutch mechanism.

In an embodiment, the clutch control members of the first and second clutch mechanisms take the form of pivot levers projecting from a common face of the housing.

In an embodiment, the first and second clutch mechanisms are identical.

In an embodiment, the reduction gears are identical. This simplifies assembly and reduces the number of part references.

In an embodiment, the first motor and the second motor are carried by the housing. This results in increased compactness of the transmission.

In an embodiment, the first and second motors are variable speed direction-reversible electric motors and preferably at least one of the first and second motors presents a maximum speed of rotation that is not less than 10 000 revolutions per minute (rpm). This results in the transmission having a range of speed variation that is further improved.

In an embodiment, the connection part between the first outlet shaft section and the second outlet shaft section takes the form of a sleeve, into which there is engaged the end of each outlet shaft section that is turned to face the other outlet shaft section.

In an embodiment, the sleeve constituting the connection part connecting together the first outlet shaft section and the second outlet shaft section presents a length that is not less than 4 times the inside diameter of the sleeve.

The invention further provides a wheeled vehicle characterized in that it is fitted with a transmission of the above-mentioned type, the outlet shaft of the transmission forming the shaft for driving the wheels of the vehicle.

BRIEF DESCRIPTION OF THE DRAWINGS

The invention can be better understood on reading the following description of embodiments given with reference to the accompanying drawings, in which.

DETAILED DESCRIPTION

Figure 1:
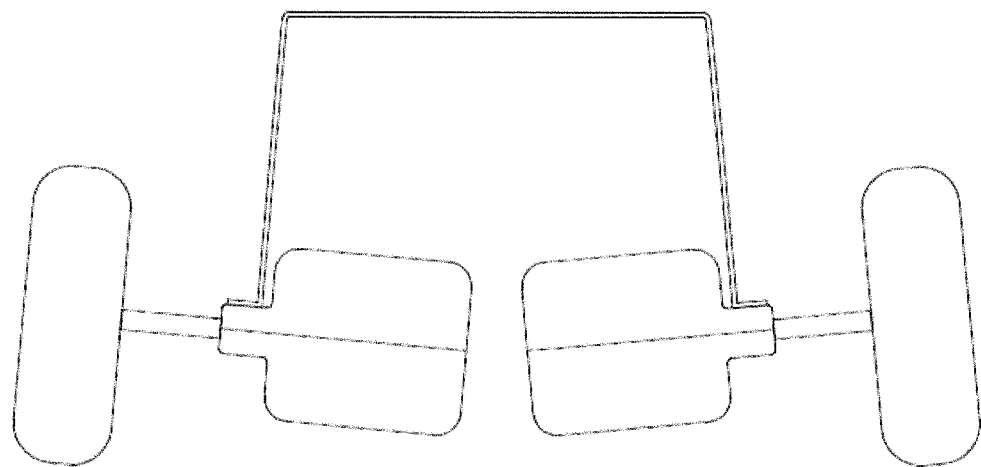
FIG. 1 is a diagrammatic view of a wheeled vehicle equipped with a transmission in accordance with the prior art as mentioned above.
Figure 2:
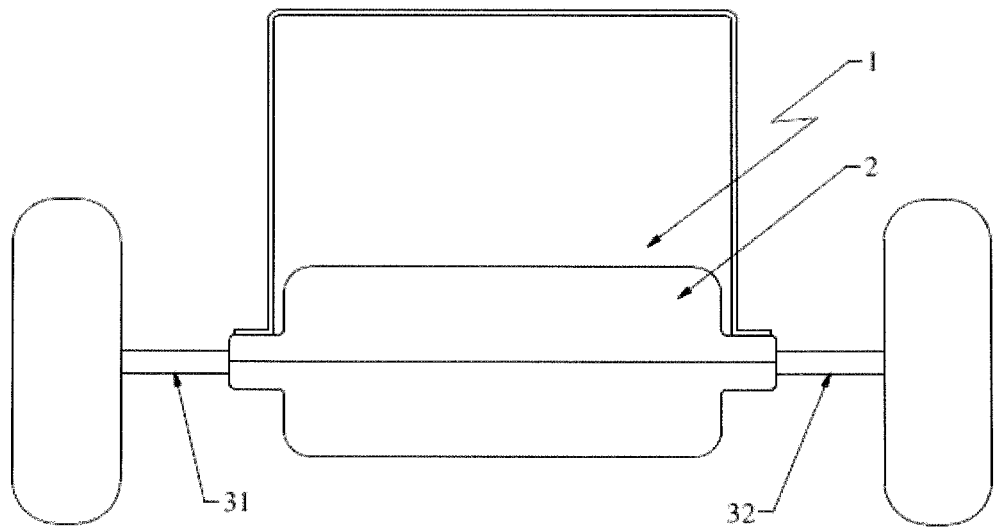
FIG. 2 is a diagrammatic view of a wheeled vehicle equipped with a transmission of the invention.

As mentioned above, the transmission 1 of the invention is more particularly designed to drive the movement of a wheeled vehicle, such as a snow plough, a mowing tractor, a golf cart, or other vehicle.

The transmission 1 comprises a housing 2 defining an enclosure. The housing 2, preferably made of synthetic material, is formed by two half-shells that can be assembled together by bearing contact between the facing surfaces of the two half-shells. The housing 2 is generally filled with a lubricant. The outlet shaft of the transmission, which in this embodiment forms the drive shaft for driving the wheels of a pair of wheels of the vehicle is inserted in part inside the housing. This outlet shaft is formed by a first outlet shaft section 31 and by a second outlet shaft section 32, which sections are connected together in such a manner as to be free to rotate relative to each other via at least one connection part 6 arranged inside the housing 2. The outlet shaft extends in the assembly zone between the two half-shells of the housing. The outlet shaft thus extends longitudinally in the plane in which the half-shells of the housing are joined together. For each outlet shaft section, the half-shells, referred to as "top" and "bottom" half-shells, thus include respective bearing portions for receiving each of said outlet shaft sections. This arrangement of the outlet shaft sections relative to the junction plane between half-shells makes it possible to use the stiffness of the housing in order to limit the risks of the outlet shaft breaking or bending.

The connection part 6 connecting outlet shaft sections 31, 32 together takes the form of a sleeve, preferably made of metal, into which there is engaged the end of each outlet shaft section that is turned to face the other outlet shaft section. The sleeve constituting the connection part 6 connecting together the first outlet shaft section 31 and the second outlet shaft section 32 presents a length that is not less than 4 times the inside diameter of the sleeve. Preferably, the sleeve presents a minimum length that is not less than 70 millimeters (mm). The end of each shaft section opposite from its end that is engaged on the connection part 6 projects from the housing and is fitted with a drive wheel for moving the vehicle. Thus, the force generated by the chassis of the vehicle does not lead to bending of the outlet shaft and limits the risks of deforming the housing.

The transmission 1 further comprises a first motor 41 and a second motor 42. These motors 41 and 42 are arranged outside the housing. This arrangement of motors outside the housing makes it possible, if necessary, to distribute the weight of the motors across the housing in optimum manner in order to limit the force applied on the outlet shaft. In the example shown, the first motor 41 and the second motor 42 are carried by the housing 2 and the first and second motors 41, 42 are variable speed direction-reversible electric motors. These first and second motors present a maximum speed of rotation that is not less than 10 000 rpm. In particular, in the example shown, the first motor and the second motor are carried by the bottom half-shell of the housing, this bottom half-shell of the housing that carries the outlet shaft being covered by the top half-shell of the housing. The first and second motors thus extend on either side of the outlet shaft with their respective drive shafts parallel to the outlet shaft.

Because of the way the remainder of the transmission is designed, these motors are small motors, i.e. having a relatively high speed of rotation with low torque, thereby reducing cost. It should be observed that in a variant, the motors could be housed outside the housing, but in a manner that is offset from said housing.

Each of these first and second motors has a respective drive shaft delivering rotary motion that is suitable for being transmitted to a respective inlet shaft of the transmission. Thus, the drive shaft of the first motor 41 is suitable for transmitting its rotary motion to the first inlet shaft 51 of the transmission, while the drive shaft of the second motor 42 is suitable for transmitting its rotary motion to the second inlet shaft 52 of the transmission. These first and second inlet shafts extend parallel to the outlet shaft.

In the example shown, in order to transmit such motion, the drive shaft of each motor 41, 42 is fitted with an epicyclic gear train 15, 16, which is itself known, and which is therefore not described in detail.

The outlet of the reducing epicyclic gear train is coupled to the inlet shaft via an endless transmission, specifically a chain transmission in this example. Thus, the drive shaft of the first motor 41 is suitable for transmitting its rotary motion, via the epicyclic gear 15 and an endless transmission 191, to the first inlet shaft 51, while the drive shaft of the second motor 42 is suitable for transmitting its rotary motion, via the epicyclic gear 16 and an endless transmission 192, to the second inlet shaft 52. In the example shown, the first and second inlet shafts are housed at least in part inside the housing 2.

The transmission further comprises two intermediate shafts 101 and 102, extending inside the housing, parallel to the first and second inlet shafts 51, 52. Thus, the rotary motion of the first inlet shaft 51 is suitable for being transmitted to the intermediate shaft 101, while the rotary motion of the second inlet shaft 52 is suitable for being transmitted to the intermediate shaft 102. These intermediate shafts 101, 102 also extend parallel to the first and second outlet shaft sections 31, 32. Each intermediate shaft transmits its rotary motion to the outlet shaft section associated therewith, by means of a respective set of gears.

In order to enable motion to be transmitted in this way between the inlet shaft and the intermediate shaft, there are provided both a clutch mechanism carried either by the inlet shaft or by the intermediate shaft, and also at least one gear train comprising at least two meshing pinions one mounted on the inlet shaft and the other mounted on the intermediate shaft.

Figure 3:
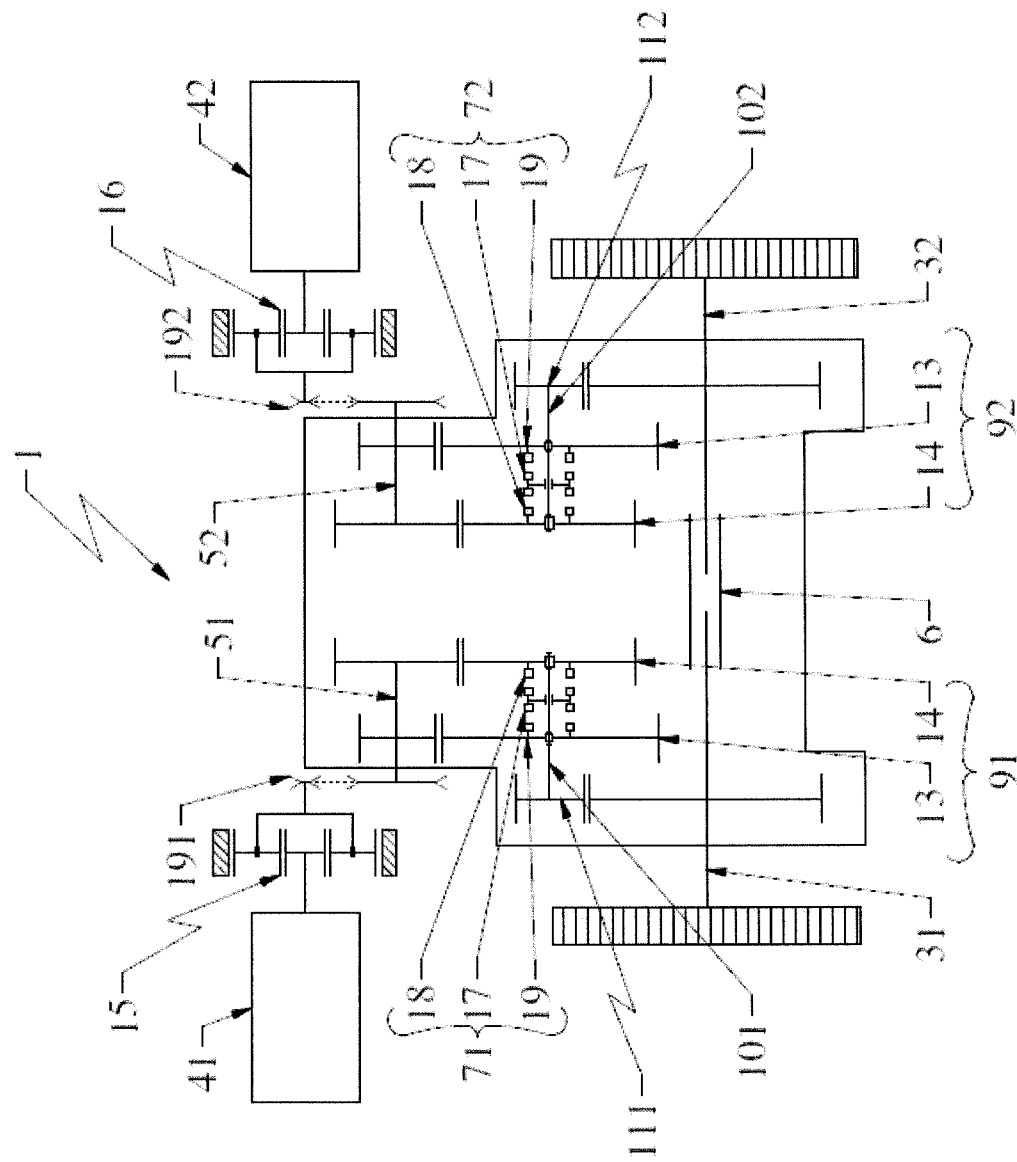
FIG. 3 is a gearing diagram of a first embodiment of a transmission of the invention.
Figure 4:
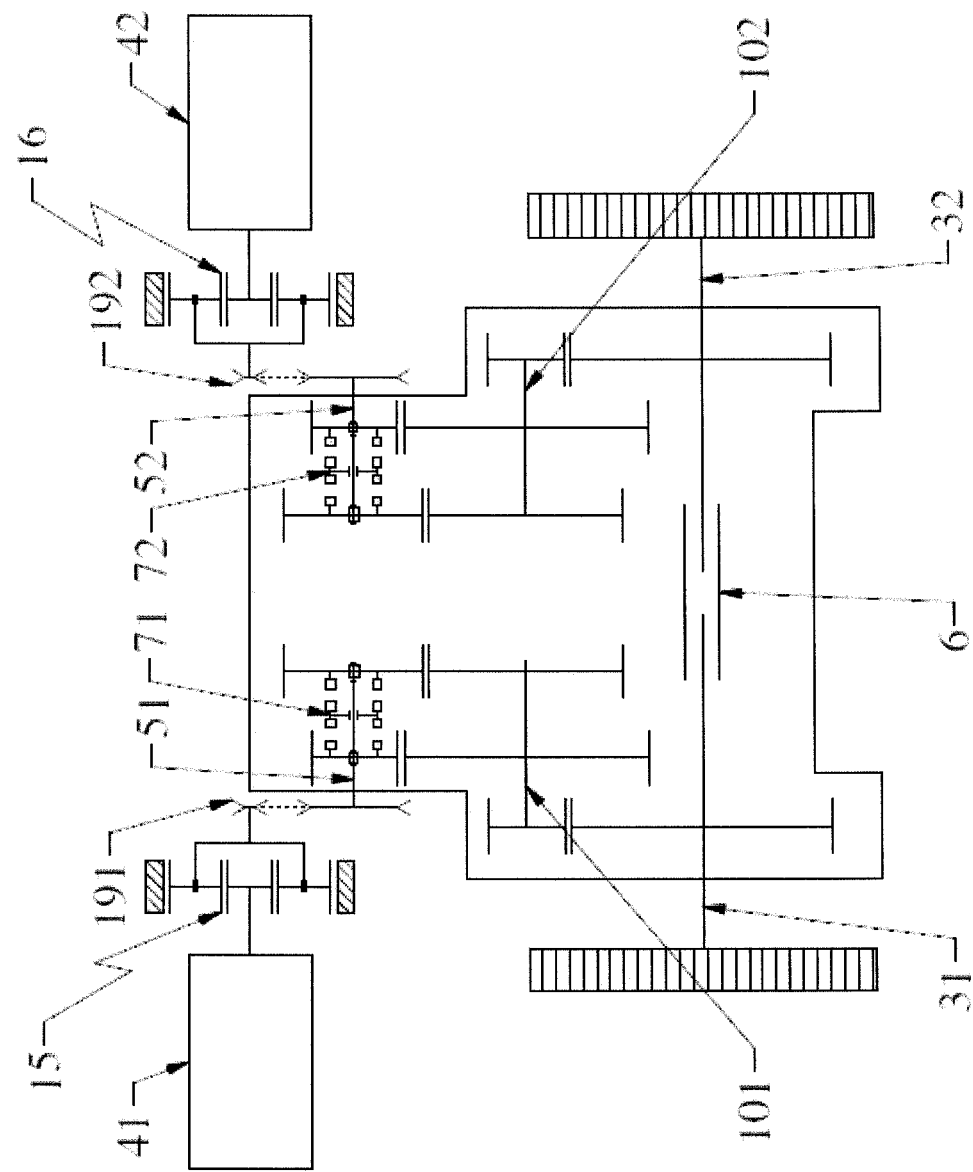
FIG. 4 is a gearing diagram of a second embodiment of a transmission of the invention.
Figure 5:
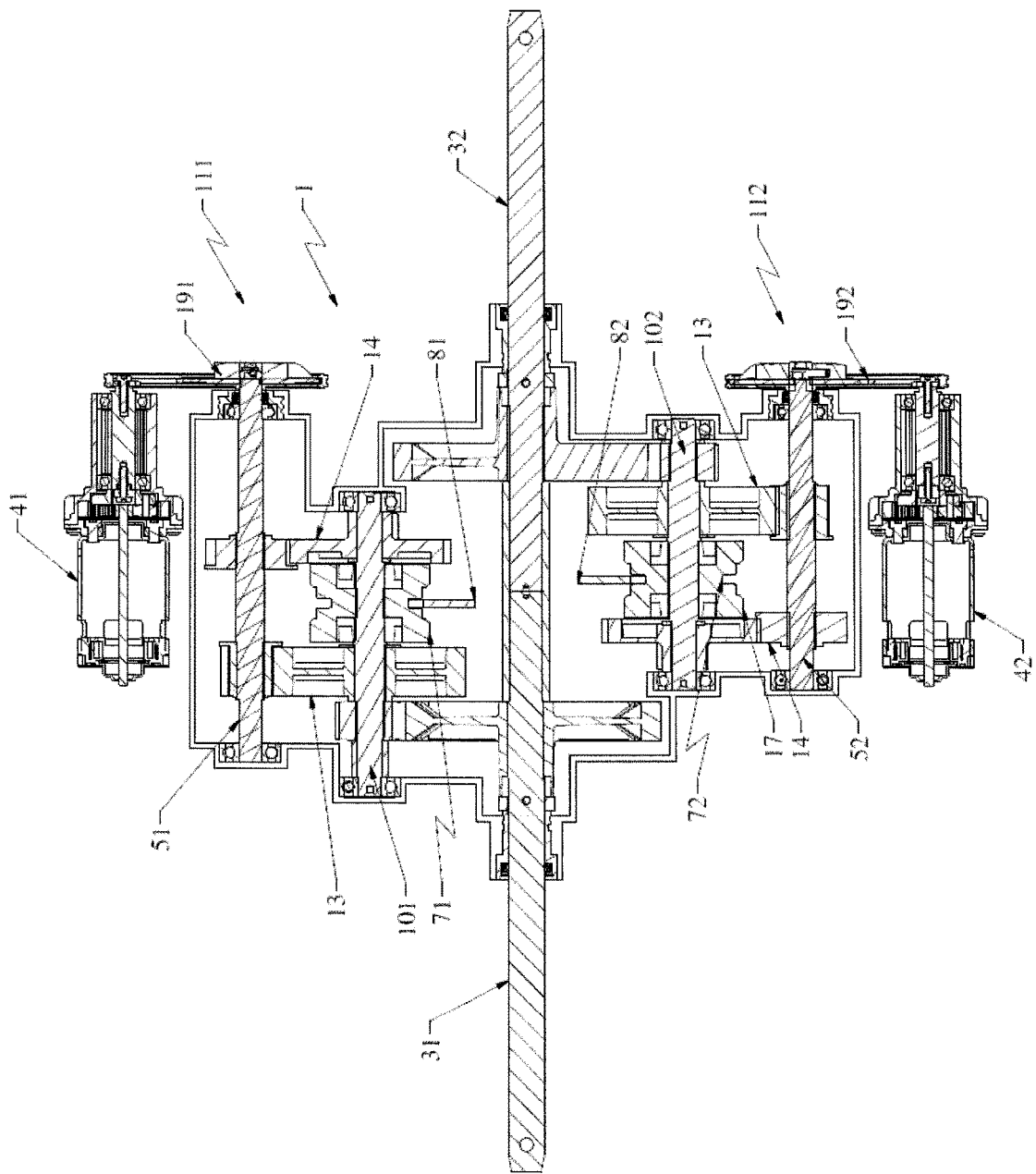
FIG. 5 is a flat gearing diagram of the transmission of FIG. 3.
Figure 6:
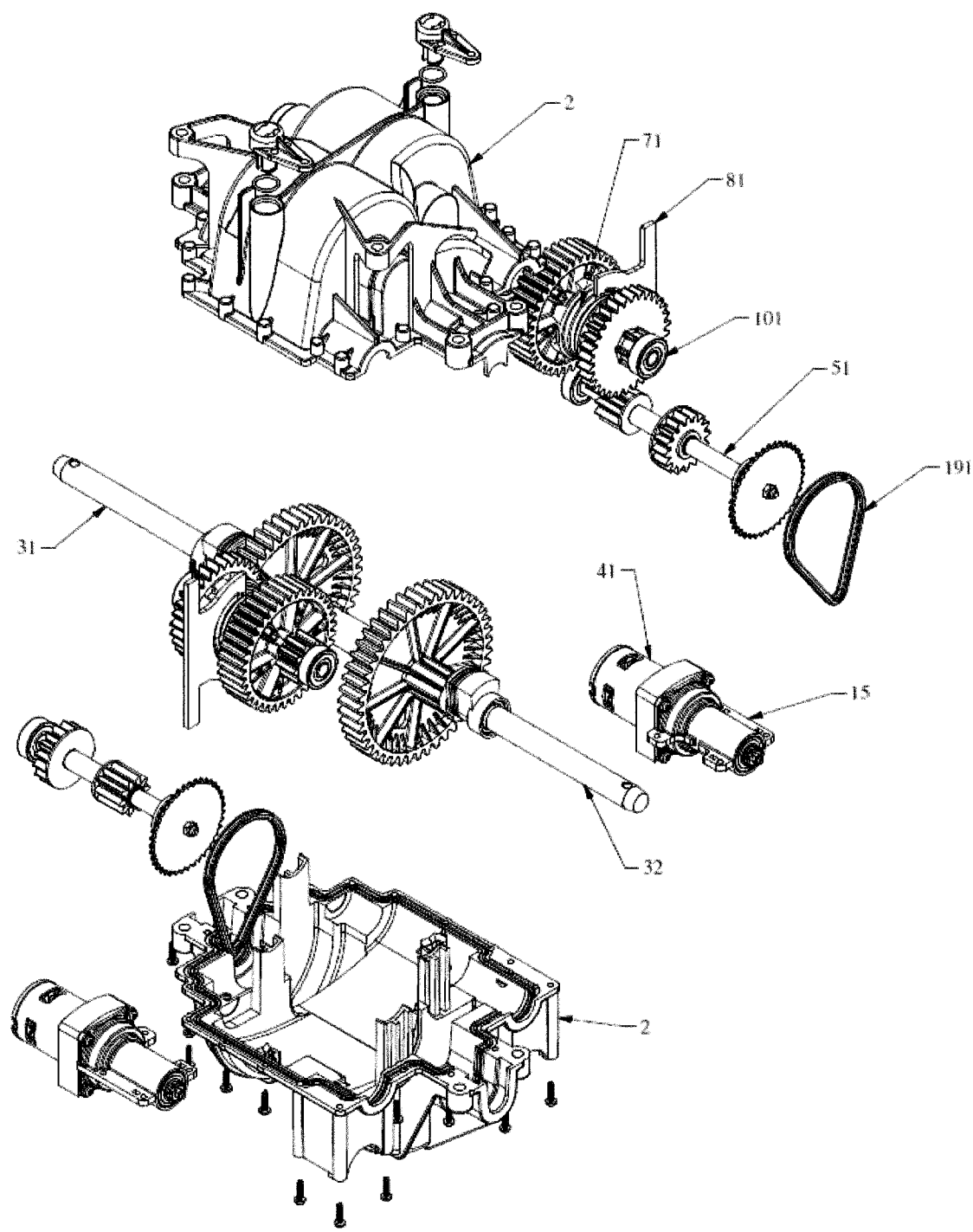
FIG. 6 is a perspective view showing elements constituting a transmission of the invention in an exploded position.
Figure 7:
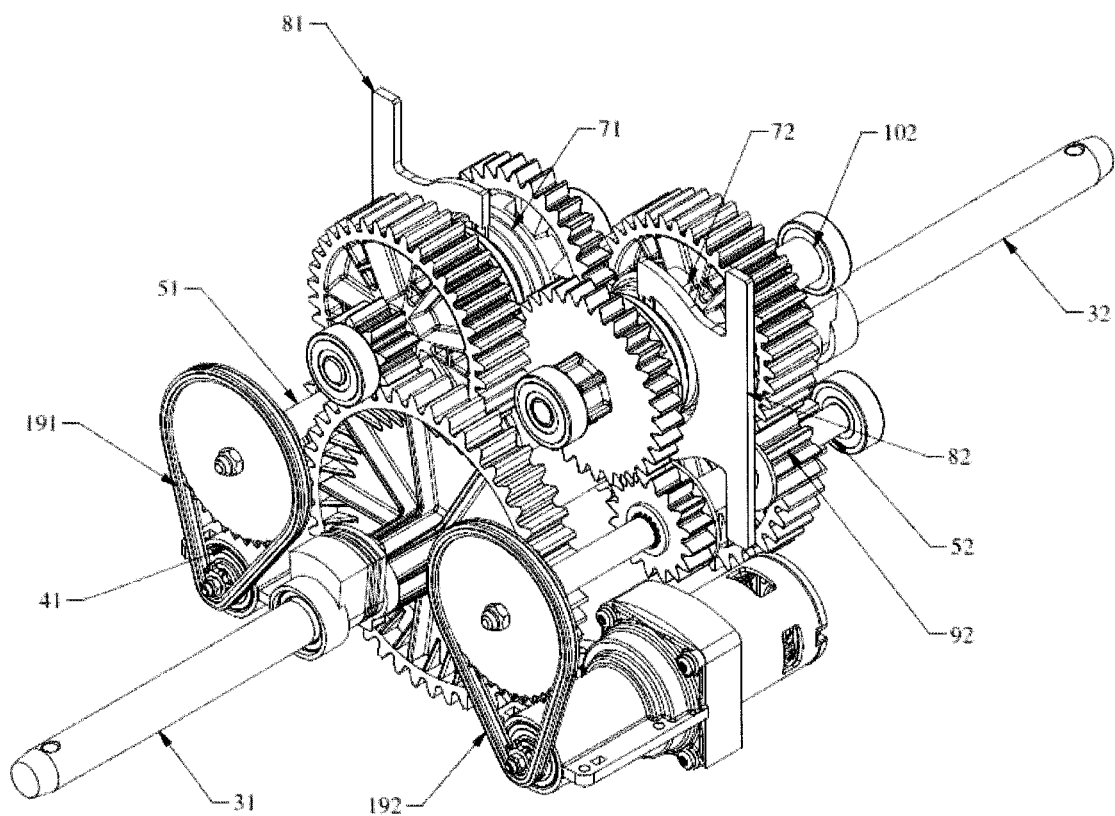
FIG. 7 is a perspective view showing elements constituting a transmission of the invention in the assembled-together state.
Figure 8:
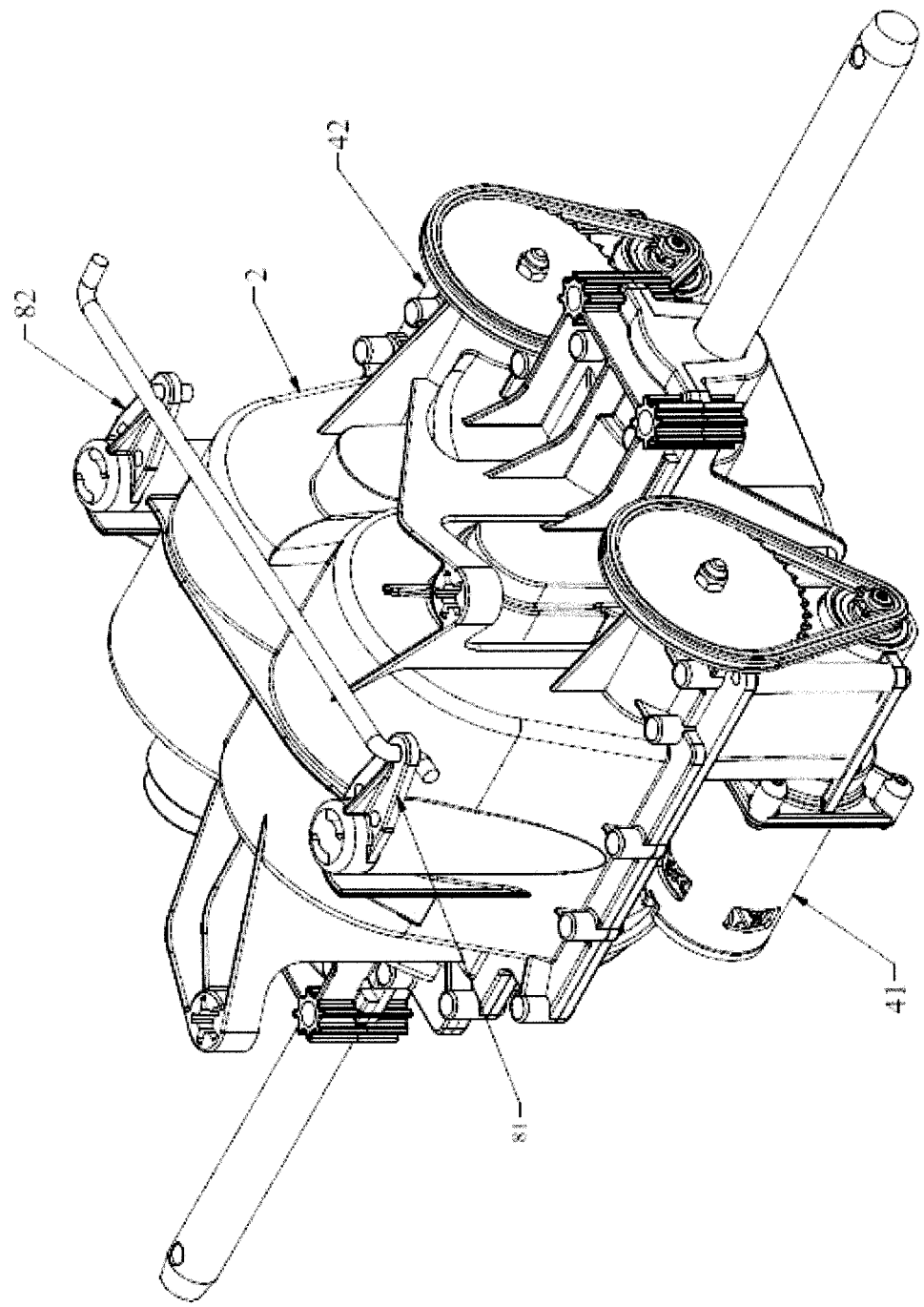
FIGS. 8 and 9 are perspective views of a transmission housing of the invention.
Figure 9:
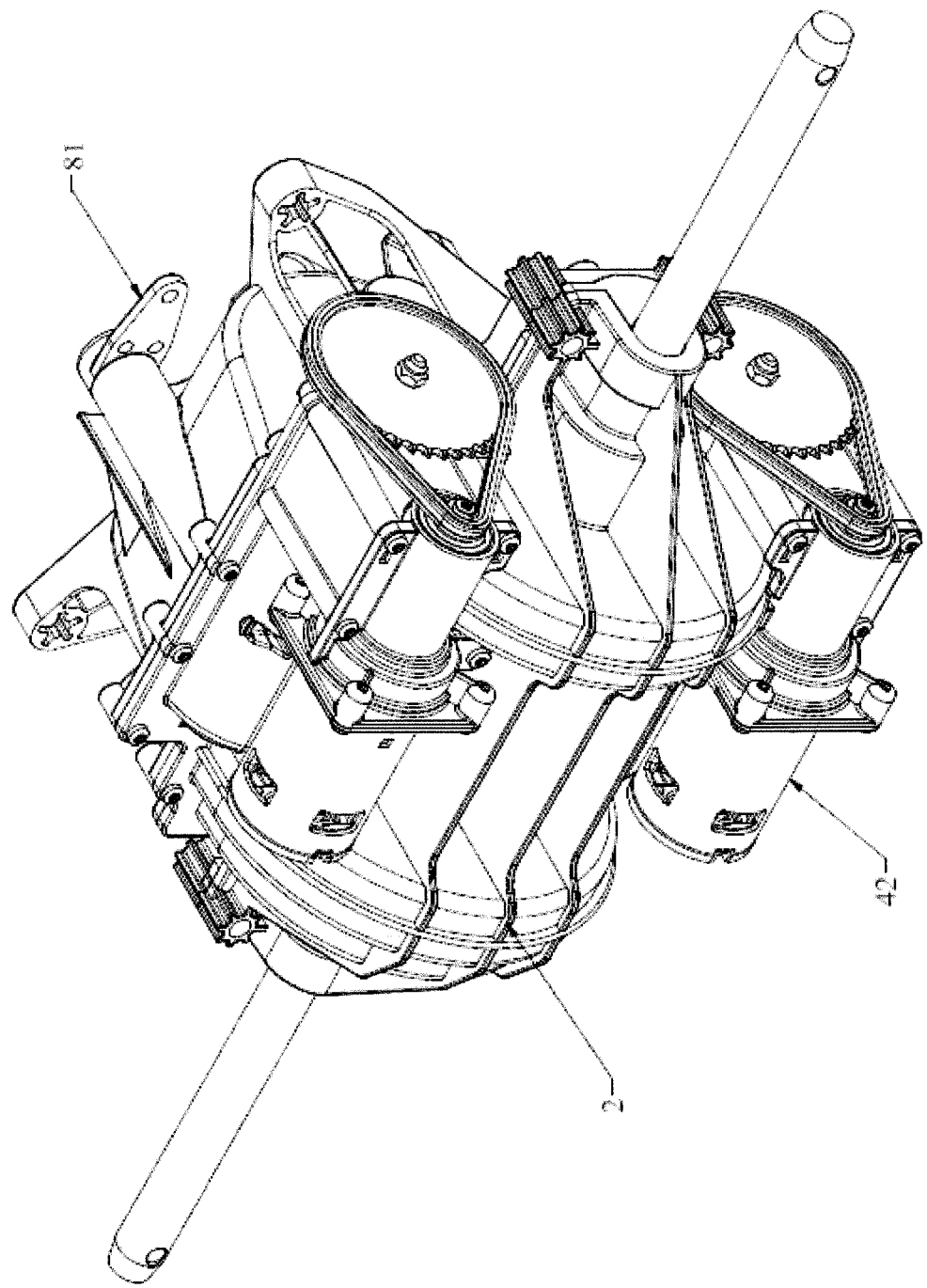
Figure 10A:
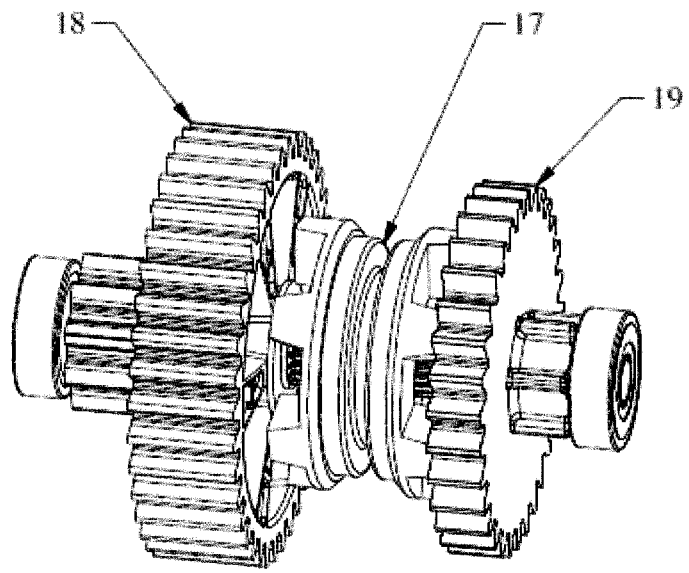
FIGS. 10A and 10B are detail views showing the dog clutch mechanism.
Figure 10B:
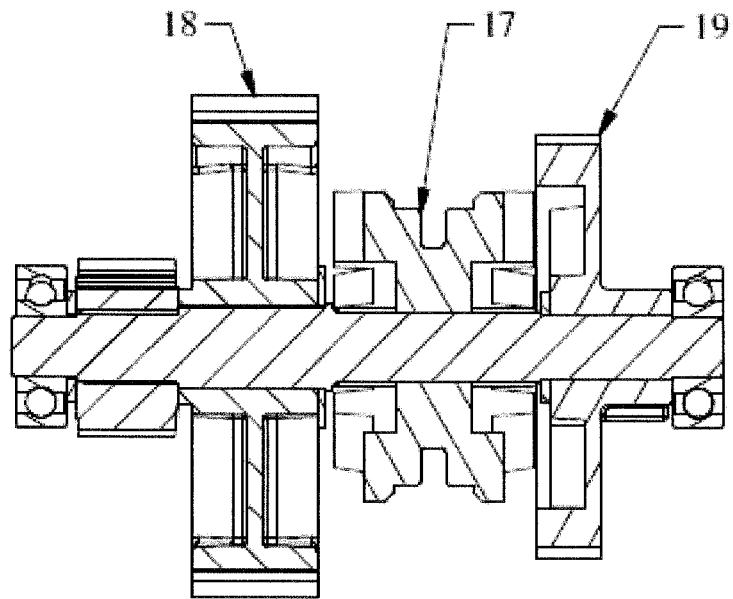

In the example shown in FIG. 3, the clutch mechanisms are carried by the intermediate shafts, while in the example shown in FIG. 4, the clutch mechanisms are carried by inlet shafts. These clutch mechanisms are housed inside the housing and each of them is fitted with a control member that projects from the housing and that is carried by the housing.

Thus, in the example shown in FIG. 4, a first clutch mechanism having reference 71 is carried by the first inlet shaft 51, while a second clutch mechanism having reference 72 is carried by the second inlet shaft 52.

Thus, in the example shown in FIG. 3, a first clutch mechanism having reference 71 is carried by the intermediate shaft 101, while a second clutch mechanism having reference 72 is carried by the other intermediate shaft 102.

In the examples shown, two gear trains having references 13 and 14 in the figures are provided, one between each inlet shaft and the intermediate shaft associated therewith. These gear trains present a reduction ratio that is different from one gear train to the other. As mentioned above, each gear train comprises at least two meshing pinions, one mounted on the inlet shaft and the other mounted on the intermediate shaft.

In the example shown in FIG. 3, the pinions of the gear trains mounted on the first and second inlet shafts are mounted to be constrained to rotate with said first and second inlet shafts, while the pinions of the trains mounted on the intermediate shafts 101, 102 are mounted to rotate freely on said shafts, each of which carries a respective clutch mechanism so as to enable motion to be transmitted from the inlet shaft to the intermediate shaft when the clutch mechanism is in the clutched state.

In the example shown in FIG. 4, the pinions of the gear trains mounted on the first and second inlet shafts are mounted to rotate freely on the first and second inlet shafts, while the pinions of the trains mounted on the intermediate shafts 101, 102 are mounted to be constrained to rotate with said shafts. Each of the first and second inlet shafts carries a respective clutch mechanism for enabling motion to be transmitted from the inlet shaft to the intermediate shaft when the clutch mechanism is in the clutched state.

In the examples shown, the first and second clutch mechanisms 71, 72 are identical, and each of them forms a dog clutch mechanism. Each dog clutch mechanism comprises two "stationary" dog clutches 18, 19 mounted to be axially stationary and free to rotate on the shaft 51, 101; 52, 102 carrying the clutch mechanism 71, 72 and, interposed between said stationary dog clutches 18, 19, a movable dog clutch 17 mounted, on the shaft 51, 101; 52, 102 carrying said clutch mechanism 71, 72, constrained to rotate therewith, and axially movable by means of the clutch control member 81, 82 of said clutch mechanism 71, 72 to move said movable dog clutch 17 between a declutched position away from said stationary dog clutches 18, 19, a first clutched position engaged with one of the stationary dog clutches 18, and a second clutched position engaged with the other stationary dog clutch 19.

The movable dog clutch is in the form of a wheel threaded onto the shaft that carries it. This wheel is constrained to rotate with the shaft that carries it, by pinning or by means of fluting, etc. This wheel is provided on each of its faces with axial dog teeth.

Each stationary dog clutch is formed by a pinion threaded on the shaft that carries it and mounted to rotate freely on said shaft, but axially stationary on said shaft. On its face facing the movable dog clutch, each stationary dog clutch is provided with axial dog teeth that penetrate between the dog teeth of the movable dog clutch, when the clutch mechanism is in the clutched state.

In order to pass from the declutched position to one of the clutched positions, the operator, namely the driver of the vehicle in this example, actuates the clutch control member. In the examples shown, the clutch control members 81, 82 of the first and second clutch mechanisms 71, 72 take the form of pivot levers projecting from a common face of the housing 2. In particular, each clutch control member is formed by a two-pronged fork. Each prong is provided with an inwardly-directed radial tooth that is inserted into an outwardly-directed peripheral annular recess in the movable dog clutch. This fork is movable angularly and, during its angular movement, causes the movable dog clutch to move axially.

Each stationary dog clutch forms one of the pinions of the above-mentioned gear train that extends between the inlet shaft and the intermediate shaft. This pinion meshes with a second pinion carried by the intermediate or inlet shaft, which does not carry the clutch mechanism. In the example of FIG. 3, it is the inlet shaft. Thus, in the example shown in FIG. 3, motion can be transmitted between an inlet shaft and an intermediate shaft as described below. This description refers to the first inlet shaft, bearing in mind that it applies in similar manner to the second inlet shaft.

The first inlet shaft thus carries two pinions that are constrained to rotate with the shaft and each of which meshes with a respective stationary dog clutch 18, 19 of the first clutch mechanism 71 carried by the intermediate shaft 101. In the declutched position of the first clutch mechanism 71, rotary motion of the first inlet shaft is transmitted to the stationary dog clutches that are mounted to be free to rotate on the intermediate shaft 101. The intermediate shaft 101 is therefore not driven in rotation. In the first clutched position of the first clutch mechanism, the movable dog clutch 17 comes into engagement, e.g. with the stationary dog clutch 18. As a result, the rotary motion of the first inlet shaft is transmitted, via the gear train 14 including the stationary dog clutch 18 and by means of the movable dog clutch, to the intermediate shaft 101, which itself is engaged by gearing meshing with the first outlet shaft section 31, so as to rotate the first outlet shaft section 31 at a speed that is a function of the reduction ratio of the gear train including the stationary dog clutch 18. In the second clutched position of the first clutch mechanism, the movable dog clutch 17 comes into engagement, e.g. with the stationary dog clutch 19. As a result, the rotary motion of the first inlet shaft is transmitted, via the gear train 13 including the stationary dog clutch 19 and by means of the movable dog clutch, to the intermediate shaft 101, which itself is engaged by gearing meshing with the first outlet shaft section 31, so as to rotate the first outlet shaft section 31 at a speed that is a function of the reduction ratio of the gear train including the stationary dog clutch 19.

Since the gear trains 13, 14 have different reduction ratios, the first outlet shaft section 31 may be driven at speeds of rotation that are different as a function of the selected gear train. It should be observed that in the declutched position of the clutch mechanism, the first outlet shaft section is free to turn in either direction of rotation, which corresponds to causing the wheel of the vehicle associated with the first outlet shaft section to freewheel.

The speed of rotation of the first outlet shaft section may further be varied by varying the speed of rotation of the drive shaft of the first motor. In addition, its direction of rotation may be reversed, as a function of the direction of rotation of the first motor.

As mentioned above, operation of the second transmission assembly 112 formed by the second motor 42, the second inlet shaft 52, the second clutch mechanism 72 carried by the second inlet shaft 52 or by an intermediate shaft 102 to which the motion of the second inlet shaft 52 is suitable for being transmitted, the second outlet shaft section 32, and the reduction gear 92 arranged at least in part between the second motor 42 and the second outlet shaft section 32 is similar to operation of the first transmission assembly 111 formed by the first motor 41, the first inlet shaft 51, the first clutch mechanism 71 carried by the first inlet shaft 51 or by an intermediate shaft 101 to which the rotary motion of the first inlet shaft is suitable for being transmitted, the first outlet shaft section 31, and the reduction gear 91 arranged at least in part between the first motor 41 and the first outlet shaft section 31, as described above.

FIG. 4 differs from FIG. 3 only by the fact that the clutch mechanisms are carried by inlet shafts. Thus, the motion can be transmitted between an inlet shaft and an intermediate shaft as described below. This description refers to the first inlet shaft, bearing in mind that it applies in similar manner to the second inlet shaft.

The first inlet shaft therefore carries the stationary dog clutches 18, 19 and the movable dog clutch 17 of the first clutch mechanism 71. Each stationary dog clutches 18, 19 meshes with a respective pinion carried by the intermediate shaft 101 and mounted to be constrained to rotate with said intermediate shaft. It should be observed that the same numerical references are used to designate similar elements.

In the declutched position of the first clutch mechanism, the rotary motion of the first inlet shaft is transmitted to the intermediate shaft. It should be observed that the rotary motion of the intermediate shaft can be transmitted to the first outlet shaft section, by means of gearing between the intermediate shaft and the first outlet shaft section. In the first clutched position of the first clutch mechanism, the movable dog clutch comes into engagement with the stationary dog clutch 18 and the rotary motion of the first inlet shaft is transmitted, via the movable dog clutch, to the stationary dog clutch 18, which itself transmits its rotary motion to the intermediate shaft 101 by meshing with a pinion carried by and constrained to rotate with the intermediate shaft 101. This rotary motion of the intermediate shaft 101 is then transmitted by means of gearing to the first outlet shaft section.

In the second clutched position of the first clutch mechanism, the movable dog clutch comes into engagement with the stationary dog clutch 19 and the rotary motion of the first inlet shaft is transmitted to the stationary dog clutch 19, which itself transmits its rotary motion to the intermediate shaft 101 by meshing with a pinion carried by and constrained to rotate with the intermediate shaft 101. This rotary motion of the intermediate shaft 101 is then transmitted by means of gearing, which may be the same as the gearing used in the first clutched position, to the first outlet shaft section. Once again, the speed of rotation of the intermediate shaft is a function of the reduction ratio of the gear train between the inlet shaft and the intermediate shaft.

Operation of the second transmission assembly formed by the second motor, the second inlet shaft, the second clutch mechanism carried by the second inlet shaft or by an intermediate shaft to which the motion of the second inlet shaft is suitable for being transmitted, the second outlet shaft section, and the reduction gear arranged at least in part between the second motor and the second outlet shaft section is similar to operation of the first transmission assembly formed by the first motor, the first inlet shaft, the first clutch mechanism carried by the first inlet shaft or by an intermediate shaft to which the rotary motion of the first inlet shaft is suitable for being transmitted, the first outlet shaft section, and the reduction gear arranged at least in part between the first motor and the first outlet shaft section, as described above.

It should be observed that, in the above-described embodiments, at the portion of the reduction gear that is arranged between the inlet shaft and an intermediate shaft to which the motion of the inlet shaft is suitable for being transmitted, both the reduction gear arranged between the first motor and the first outlet shaft section and also the reduction gear arranged between the second motor and the second outlet shaft section includes at least one gear train, and in this example two gear trains, each gear train being formed by at least two pinions, one of which is carried by the inlet shaft and the other or another of which is carried by the outlet shaft, one of the pinions forming the stationary dog clutch of the clutch mechanism.

Naturally, a combination of the two above-described embodiments may also be envisaged, with for example, a first transmission assembly as shown in FIG. 3 and a second transmission assembly as shown in FIG. 4, housed in the same housing.

In a variant, it may also be envisaged, in a manner that is not shown, to replace the two gear trains arranged between the inlet shaft and the intermediate shaft of each transmission assembly by a single gear train. In this configuration, the clutch mechanism of the transmission assembly presents a declutched position and a clutched position, and the outlet shaft section of said transmission assembly is mounted to rotate freely in a declutched position of the clutch mechanism, and to be engaged with the inlet shaft of said transmission assembly via the gear train in the clutched position of the clutch mechanism.

The clutch mechanism may be operated in different ways by the operator, specifically the driver of the vehicle. In the example shown, the clutch control member 81 for controlling the first clutch mechanism 71 is mounted to be constrained to move with the clutch control member 82 for controlling the second clutch mechanism 72. However, the clutch control members may be independently movable, without going beyond the ambit of the invention.

It is thus possible to obtain for each section of the outlet shaft, a direction of rotation and/or a speed that are different to the direction and/or speed of the other section of the outlet shaft, thus offering a large number of possibilities for control and thus for vehicle handling.

The invention claimed is:

1. A transmission comprising:
a housing defining an enclosure;
an outlet shaft housed at least in part in said housing;
a first motor;
a second motor; and
two reduction gears;
wherein the first motor and the second motor are outside the housing, wherein the transmission further comprises a first inlet shaft, a second inlet shaft, and two clutch mechanisms, said first and second inlet shafts are respectively suitable for being driven in rotation, one of them by the first motor, the other one of them by the second motor,
wherein the outlet shaft parallel to the first and second inlet shafts is formed by a first outlet shaft section and by a second outlet shaft section, which sections are connected together in such a manner as to be free to rotate relative to each other via at least one connection part arranged inside the housing,
wherein the clutch mechanisms include a first clutch mechanism, between the first motor and the first outlet shaft section, and a second clutch mechanism between the second motor and the second outlet shaft section, are fitted with respective clutch control members that are operable by a user in order, in the clutched state of the first clutch mechanism, to enable rotary motion to be transmitted from the first inlet shaft to the first outlet shaft section and, in the clutched state of the second clutch mechanism, to enable rotary motion to be transmitted from the second inlet shaft to the second outlet shaft section, and
wherein the reduction gears, which are arranged at least in part, one of them between the first motor and the first outlet shaft section, and the other one of them between the second motor and the second outlet shaft section, are housed at least in part inside the housing,
wherein the connection part between the first outlet shaft section and the second outlet shaft section takes the form of a sleeve, into which there is engaged the end of each outlet shaft section that is turned to face the other outlet shaft section, wherein the sleeve constituting the connection part connecting together the first outlet shaft section and the second outlet shaft section presents a length that is not less than 4 times the inside diameter of the sleeve.

2. A transmission according to claim 1, wherein the first and second clutch mechanisms are respectively arranged, at least in part inside the housing, one on the first inlet shaft, or on an intermediate shaft, to which the rotary motion of the first inlet shaft is transmitted, and the other, on the second inlet shaft, or on an intermediate shaft to which the rotary motion of the second inlet shaft is transmitted.

3. A transmission according to claim 2, wherein
a first transmission assembly is formed by the first motor, the first inlet shaft, the first clutch mechanism carried by the first inlet shaft or by an intermediate shaft to which the rotary motion of the first inlet shaft is suitable for being transmitted, the first outlet shaft section, and the reduction gear arranged at least in part between the first motor and the first outlet shaft section, a second transmission assembly is formed by the second motor, the second inlet shaft, the second clutch mechanism carried by the second inlet shaft or by an intermediate shaft to which the rotary motion of the second inlet shaft is suitable for being transmitted, the second outlet shaft section, and the reduction gear arranged at least in part between the second motor and the second outlet shaft section, with the reduction gear of at least one of the first or second transmission assemblies having at least two gear trains with a reduction ratio that is different from one gear train to another, wherein each gear train of the reduction gear of said transmission assembly is arranged between the inlet shaft and the outlet shaft section of said transmission assembly, and wherein the clutch mechanism of said transmission assembly presents at least one declutched position and two clutched positions that are selectively activatable, the outlet shaft section of said assembly being mounted to be free to rotate in the declutched position of said clutch mechanism and to be engaged with the inlet shaft of said transmission assembly at least via the first gear train in the first clutched position of the clutch mechanism and at least via the second gear train in the second clutched position of the clutch mechanism.

4. A transmission according to claim 2, wherein the dog clutch mechanism comprises two stationary dog clutches mounted to be stationary axially and free to rotate on the shaft carrying the clutch mechanism and a movable dog clutch that is interposed between said stationary dog clutches, the movable dog clutch being mounted on the shaft carrying said clutch mechanism, being constrained to rotate therewith and being movable axially by means of the clutch control member of said clutch mechanism to move said movable dog clutch between a declutched position away from said stationary dog clutches, a first clutched position engaged with one of the stationary dog clutches, and a second clutched position engaged with the other stationary dog clutch.

5. A transmission according to claim 1, wherein a first transmission assembly is formed by the first motor, the first inlet shaft, the first clutch mechanism carried by the first inlet shaft or by an intermediate shaft to which the motion of the first inlet shaft is suitable for being transmitted, the first outlet shaft section, and the reduction gear arranged at least in part between the first motor and the first outlet shaft section, and a second transmission assembly is formed by the second motor, the second inlet shaft, the second clutch mechanism carried by the second inlet shaft or by an intermediate shaft to which the motion of the second inlet shaft is suitable for being transmitted, the second outlet shaft section, and the reduction gear arranged at least in part between the second motor and the second outlet shaft section, wherein the reduction gear of at least one of the first and second transmission assemblies comprises an epicyclic gear train arranged between the motor of said assembly and the shaft carrying the clutch mechanism of said assembly.

6. A transmission according to claim 1, wherein at least one and preferably each of the first and second clutch mechanisms is a dog clutch mechanism.

7. A transmission according to claim 1, wherein the clutch control member for controlling the first clutch mechanism is mounted to be constrained to move with the clutch control member for controlling the second clutch mechanism.

8. A transmission according to claim 1, wherein the clutch control members of the first and second clutch mechanisms take the form of pivot levers projecting from a common face of the housing.

9. A transmission according to claim 1, wherein the first and second clutch mechanisms are identical.

10. A transmission according to claim 1, wherein the reduction gears are identical.

11. A transmission according to claim 1, wherein the first motor and the second motor are carried by the housing.

12. A transmission according to claim 1, wherein first and second motors are variable speed direction-reversible electric motors and wherein at least one of the first and second motors presents a maximum speed of rotation that is not less than 10 000 rpm.

13. A wheeled vehicle, wherein said wheeled vehicle is fitted with a transmission in accordance with claim 1, the outlet shaft of the transmission forming the shaft for driving the wheels of the vehicle.

* * * * *